June 7, 1966  YASUKATA EGUCHI  3,254,618
BUTTONHOLE STITCHING CONTROL DEVICE
Filed Nov. 8, 1960  6 Sheets-Sheet 1
FIG_1
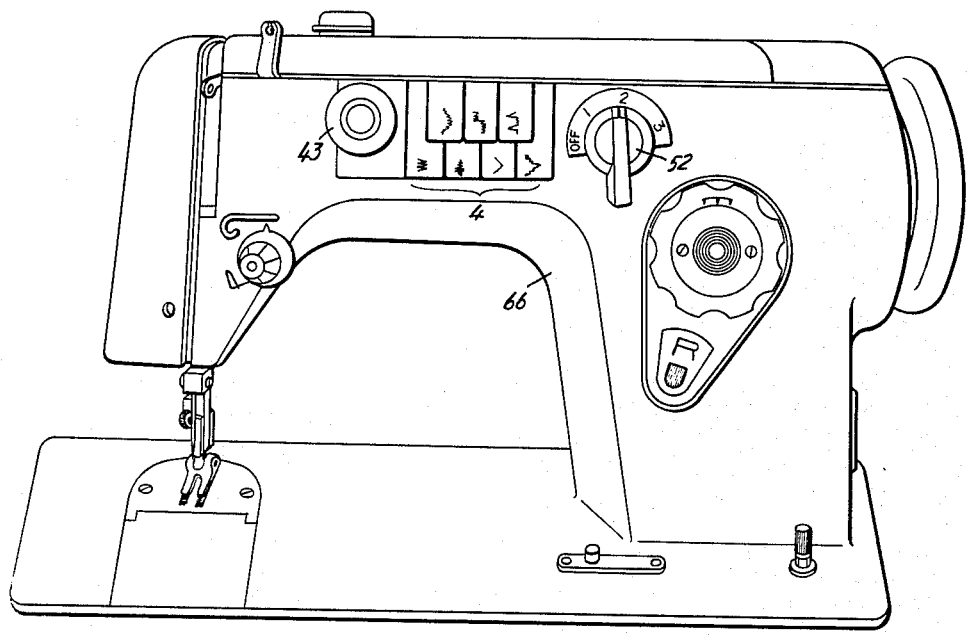
FIG_5
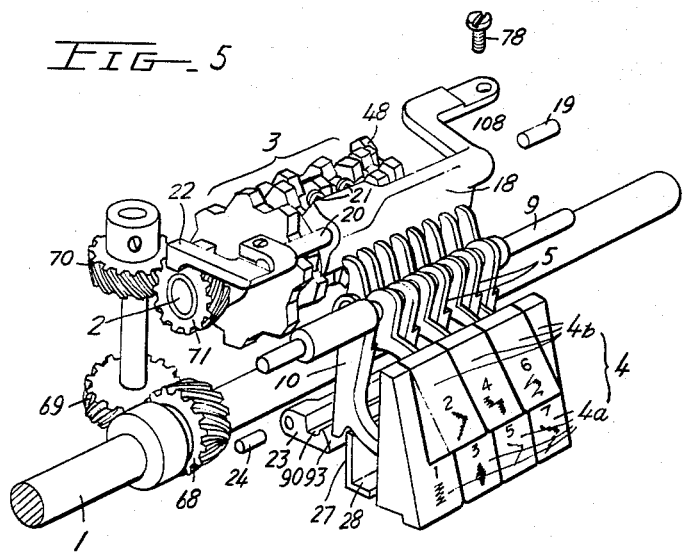
INVENTOR.
Yasukata Eguchi
BY
Michael S. Striker
Attorney

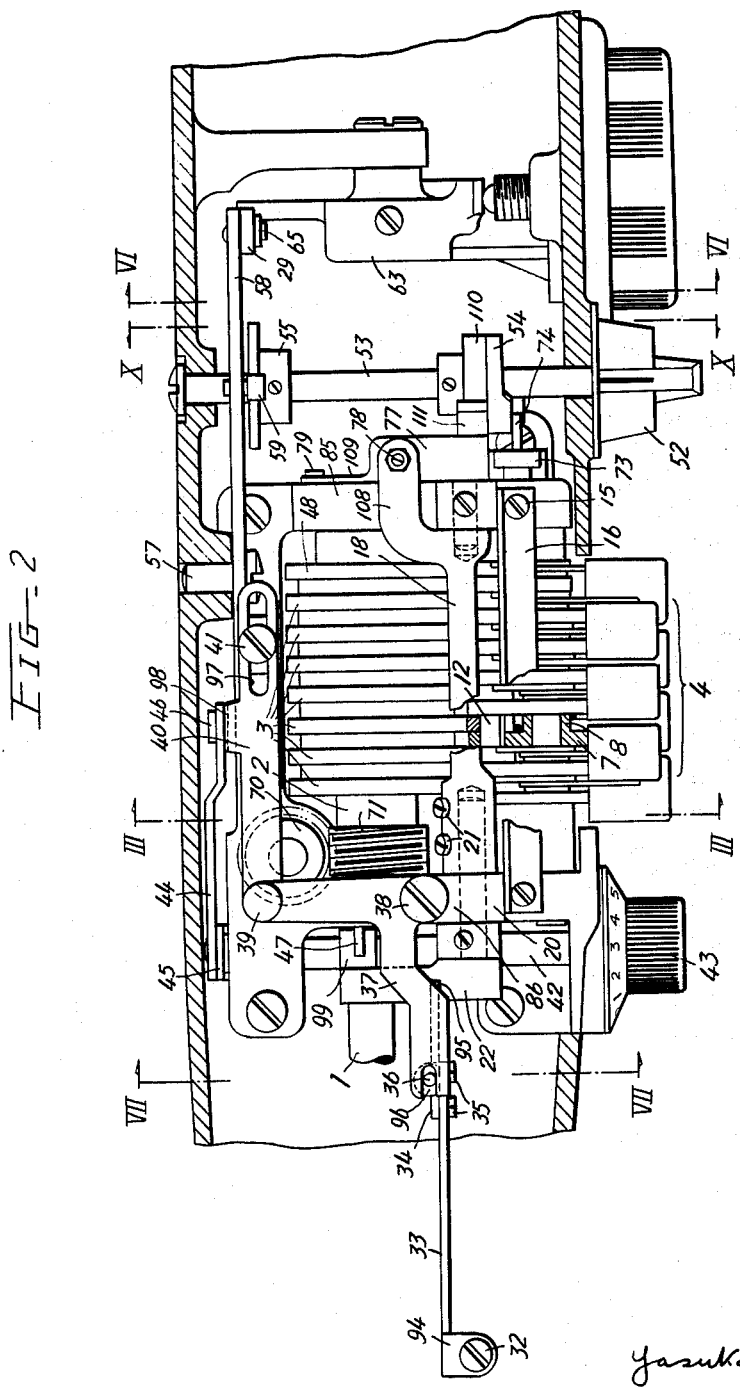

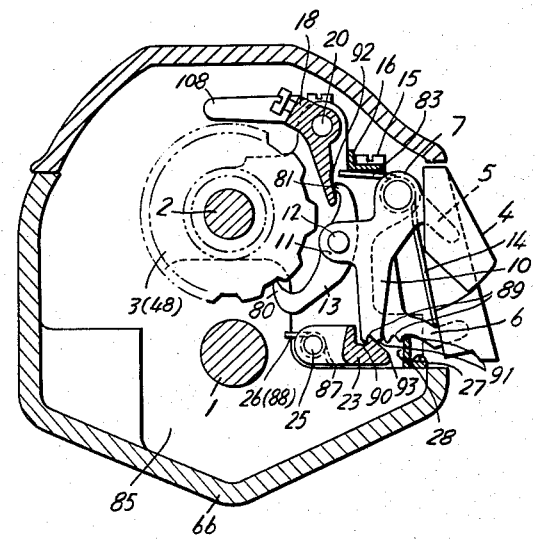
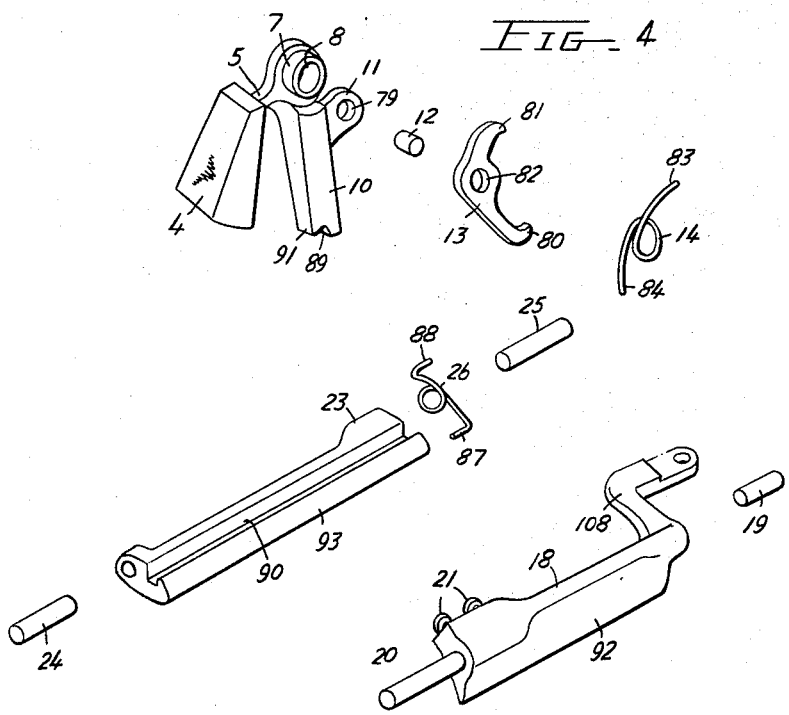

INVENTOR.
Yasukata Eguchi
BY
Michael S. Striker
Attorney

INVENTOR.
Yasukata Eguchi
BY
Michael S. Striker
Attorney

June 7, 1966 YASUKATA EGUCHI 3,254,618
BUTTONHOLE STITCHING CONTROL DEVICE
Filed Nov. 8, 1960 6 Sheets-Sheet 6

INVENTOR.
Yasukata Eguchi
BY
Michael S. Striker
Attorney

United States Patent Office 3,254,618
Patented June 7, 1966

3,254,618
BUTTONHOLE STITCHING CONTROL DEVICE
Yasukata Eguchi, Tokyo, Japan, assignor to Janome Sewing Machine Co., Ltd., Chuo-ko, Tokyo, Japan
Filed Nov. 8, 1960, Ser. No. 67,994
Claims priority, application Japan, Apr. 8, 1958, 33/9,400; Feb. 2, 1959, 34/17,586; Feb. 4, 1959, 34/4,922; Mar. 16, 1959, 34/3,532; May 30, 1959, 34/14,899; Nov. 11, 1959, 34/17,056, 34/35,471
20 Claims. (Cl. 112—158)

The present invention relates to a buttonhole stitching control device, and more particularly to a device for sewing buttonholes on a sewing machine of the type in which different ornamental stitch patterns, such as zig-zag stitches can be selected by operator controlled means.

The present invention is a continuation-in-part application of my copending applications Serial No. 802,691, filed March 30, 1959, Serial No. 6,313, filed February 2, 1960, and Serial No. 51,408, filed August 23, 1960.

It is one object of the present invention to improve a buttonhole stitching mechanism disclosed in my copending application Serial No. 51,408, and to provide a buttonhole stitching control device which will sew a buttonhole in a semi-automatic operation requiring only a minimum of control by the operator.

Another object of the present invention is to provide a buttonhole stitching control device enabling the operator to sew a buttonhole by operation of a single manually operated control knob.

Another object of the present invention is to provide a buttonhole stitching control device which can be easily provided in an ornamental sewing machine described in my above mentioned copending application without requiring substantial constructive changes.

An important object of the present invention is to provide a buttonhole stitching control device which is foolproof so that even an inexperienced operator is capable of sewing a perfect buttonhole.

A still further object of the present invention is to provide a buttonhole stitching control device whose single manual control member controls the width of the zig-zag stitches, the position of the stitches on the sides and ends of the buttonhole, and the reversal of the direction in which the material is fed at the end of the buttonhole.

With these objects in view, one embodiment of the present invention comprises an oscillatory needle support for effecting a zig-zag stitch of a reciprocating needle; operating means, preferably including a driven rotary cam, and a cam follower means operatively connected to the needle support; stop means movable between an inoperative position and an operative position for limiting movement of the needle support; and control means, preferably including a plurality of control cams, and cam followers which are operatively connected to the cam follower means of the operating means and to the stop means.

By operation of the control means, the stop means are held in the inoperative position while the cam follower means of the operating means are in a first posiiton in which the needle support performs an oscillation of small amplitude to effect a small stitch on one side of a buttonhole. When the control means is operated, the cam follower means of the operating means is placed in a second position in which the needle support is oscillated in a wider amplitude and effects a wide stitch of full length across the ends of the buttonhole. During this full stitch, the stop means is also held in the inoperative position.

When the control means is again operated, the cam follower means of the operating means remains in the position in which the cam follower means of the operating means tends to oscillate the needle support in a full amplitude stitch. However, the stop means is shifted to the operative position in which movement of the needle support is limited, so that a small stitch on the other side of the buttonhole displaced relative to the first mentioned small stitch is produced.

The sewing machine is provided with conventional feeding means for the material. Such feeding means include a feed control element which is shiftable between a forward position in which the material is forwardly fed, a reverse position in which the material is fed in the opposite direction, and an intermediate position in which no feeding takes place.

The control means of the present invention are operatively connected to the feed control element to effect forward feeding of the material while the small stitch is being made on one side of the buttonhole, to stop the feeding at the ends of the buttonhole when a wide full amplitude stitch is being made, and to reverse the feeding means when the other small stitch is being performed on the other side of the buttonhole.

In the preferred embodiment of the present invention the cam follower means of the operating means, the feed control element, and particularly the stop means are all controlled by cams mounted on a common shaft which is preferably provided with a knob for turning all control cams simultaneously through the same angle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective front view of a sewing machine provided with the device of the present invention;

FIG. 2 is a plan view of a sewing machine incorporating the device of the present invention, the top wall of the machine being omitted for the sake of clarity;

FIG. 3 is a cross-sectional view taken on line III—III in FIG. 2;

FIG. 4 is an exploded view illustrating several structural elements of the machine in perspective views;

FIG. 5 is a fragmentary perspective view illustrating the pattern selector part of the sewing machine;

Figure 6:
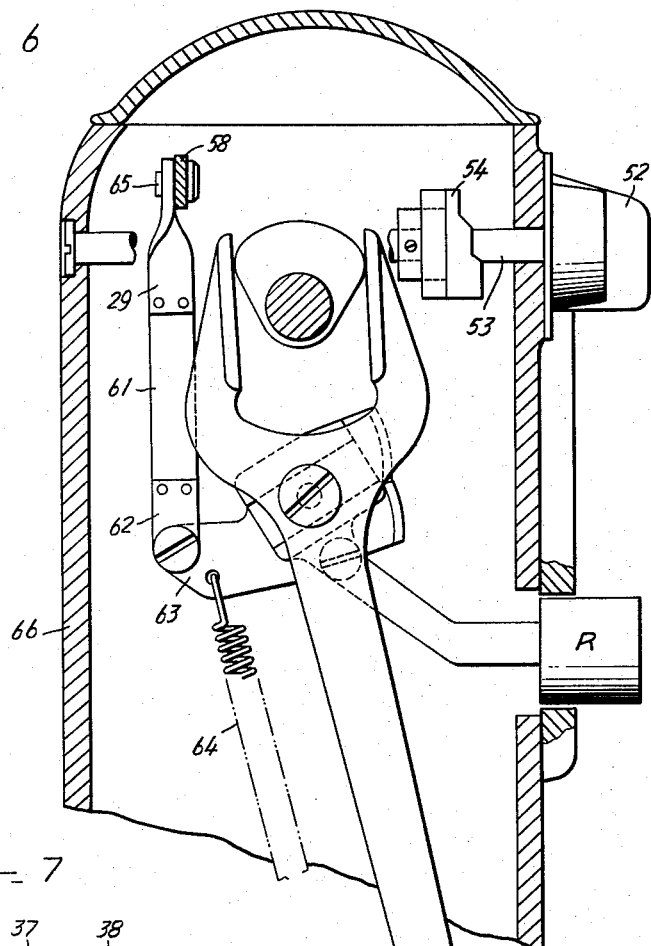
FIG. 6 is a vertical sectional view taken on line VI—VI in FIG. 2 and illustrating the feed control elements.

Referring now to the drawings, and more particularly to FIG. 1, a number of selector buttons 4 is provided by which different ornamental zig-zag stitches can be selected, and a control knob 43 effects an adjustment of the amplitude or width of the zig-zag stitches. An additional control means 52 is provided for controlling the buttonhole stitching device of the present invention and is shiftable between an "off" position and three operative positions indicated by numbers 1, 2 and 3. Referring now to FIGS. 2, 3, 5, and 7, the construction of the sewing machine will now be described. A cam shaft 2 extends parallel to the main drive shaft 1, and is connected to the same by a gear train 68, 69, 70 and 71 so that shaft 2 is driven from shaft 1.

A cam unit, best seen in FIG 5 includes a plurality of cams which are non-rotatably mounted on shaft 2, each cam having a different cam track pattern. At the end of cam unit 3, an additional operating cam 48 is non-rotatably mounted on shaft 2 so as to be rotated by the same. Cam 48 is used for the buttonhole stitching operation, as will be explained hereinafter in greater detail.

The selector keys or pushbuttons 4 are arranged in two rows 4a and 4b, each pushbutton being associated with one of the pattern cams of cam unit 3.

Arms 5 are secured to the upper pushbuttons 4b, and arms 6 are secured to the lower pushbutton 4a. Each pushbutton arm has a bushing 7 with an opening 8, as best seen in FIG. 4. A shaft 9 passes through the bushings 7 and openings 8 and turnably supports the pushbuttons 4. Each pushbutton 4 has a projection 11 with a hole 79 in which a pin 12 supporting a cam follower 13 is fixed. A spring 14 is associated with each pushbutton 4 and has one leg 84 abutting the pushbutton, and another leg 83 abutting a fixed plate 16 which is secured to the machine frame 66 by screws 15 as shown in FIG. 3. One end 80 of each cam follower 13 engages the cam track of the respective associated cam, while the other end 81 cooperates with a rockable member 18 which is supported on one end by a pin 19 mounted on the machine frame portion 85, as shown in FIG. 2, while the other end of rockable member 18 means is secured by screws 21 to a shaft 20. Shaft 20 is mounted on the frame portion 86 and has an operating arm 22 best seen in FIGS. 5, 7, 2 and 8.

Each pushbutton has a leg 10 provided with a recess 89 and a projection cooperating with a recess 90 in stop bar 23 which is supported at the ends thereof by shafts 24 and 25 between frame portions 84 and 85. A spring 26 is attached to the supporting shaft 25 and has one end 87 abutting the stop bar 23 while the other end 88 abuts the frame portion 85. In the inoperative position of the keys 4, projection 91 abuts another stop bar 27. When a key 4 is depressed, the projection 93 of stop bar 23 snaps into the recess 89 of leg 10.

When one of the pushbuttons 4 is depressed, the stop bar 23 arrests the respective pushbutton so that the cam follower 13 mounted thereon engages with leg 80 the respective pattern cam, while arm 81 engages the surface 92 of the rockable member 18. During rotation of shaft 2, the respective cam effects an oscillatory movement of the cam follower 13 which is transmitted to the rockable member 18 so that the operating arm 22 also rocks. When the stitch pattern is to be changed, another pushbutton 4 is depressed so that its leg 10 engages the sloping surface of projection 93 of locking bar 23 and effects a pivotal movement of bar 23 releasing the previously actuated key 4. Stop bar 27 determines the inoperative position of the pushbutton since projections 91 are urged against the same by spring 14.

Figure 8:
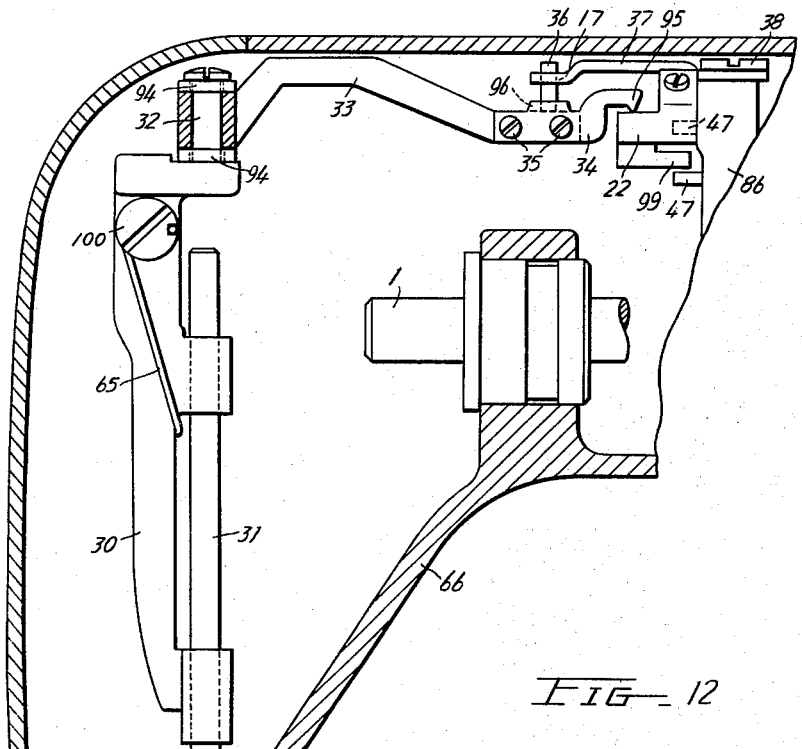
FIG. 8 is a fragmentary vertical sectional view on an enlarged scale illustrating the needle support.

The rocking motion of the rockable arm 22 is transmitted to the needle support and to the needle to effect an oscillatory motion of the needle, and thereby a zig-zag stitch. As shown in FIG. 8, the needle bar 31 is mounted in a needle support 30, and is caused to carry out a reciprocating longitudinal movement by conventional means, which are not shown in the drawing. When the needle support 30 is oscillated about a pivot 100, the needle will perform a transverse oscillatory movement resulting in zig-zag stitches. An operating arm 33 is secured to the top end of needle support 30 for pivotal movement about a pivot pin 32 and is held in position by end plates 94 and a threaded means. The end of arm 33 is secured to a member 34 by screws 35, member 34 having a knife edge 95 abutting arm 22 under the action of spring 65 which urges the needle support 30 with arm 33 and member 34, 95 to turn in clockwise direction as viewed in FIG. 8. Consequently, when rockable member 22 is rocked with rockable member 18, the needle support is oscillated, and the needle performs a transverse oscillatory motion for effecting a zig-zag stitch.

Member 34 has an upright pin 36 which is located in a slot 17 in the forked end portion of an angular lever 37 which is mounted on the frame portion 86 on a pivot 38. Lever 37 serves for adjusting the amplitude of the zig-zag stitches, and has its other end articulated to a link 40 whose guide slot 97 is guided on a pin 41 fixed to the frame of the machine.

Figure 7:
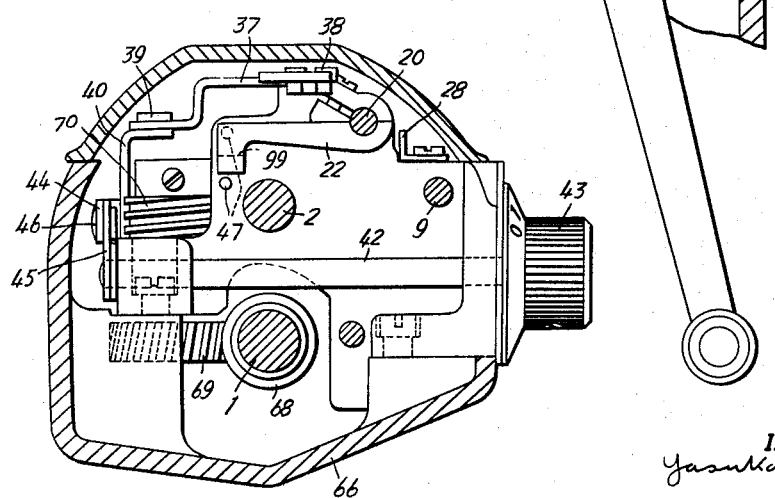
FIG. 7 is a cross-sectional view taken on line VII—VII in FIG. 2 and illustrating control means for adjusting the amplitude of the zig-zag stitch of the sewing machine.

The amplitude adjusting knob 43 is mounted on a shaft 42 which has at its other end an arm 45, see FIGS. 2 and 7, which is articulated to a link 44 whose other end is articulated by pin 46 to a projection 98 on the link 40.

Consequently, when knob 43 is turned, link 40 is shifted and effects turning of angular lever 37 about pivot 38 so that arm 33 turns about pivot pin 32 and the knife edge 95 is displaced on the rocking member 22. In this manner, the knife edge is placed closer or farther with respect to the axis of rocking member 22, so that the effective radius of arm 22, and thereby the stroke of the knife edge 95 in vertical direction is adjusted. This results in a variation of the amplitude of the oscillatory movement of needle support 30, and in a consequent variation of the transverse amplitude of the zig-zag stitches. The rockable member 22 has a transverse stop projection 99 located between a pair of stop pins 47 which determine the maximum amplitude of the rocking motion of rockable member 22, and thereby also the maximum amplitude of the zig-zag stitches. Spring 65 urges needle support 30, and arm 33 with knife edge 95 to turn in clockwise direction as viewed in FIG. 8, so that the rockable member 22 is urged to pivot downwardly to a position in which stop 99 abuts the lower stop pin 47. This position will be assumed unless rockable member 18 is turned by a cam follower to a position raising rockable member 22 against the action of spring 65.

When any one of the pushbuttons 4 is operated, the respective cam follower 13 will be rocked by the associated cam in accordance with the selected cam pattern, and effect an oscillatory motion of the rockable member 18 and 22 which is transmitting to arm 33 and needle support 30 which oscillates the needle bar 31 with the needle. The length of the stitches can be adjusted by knob 43, and when knife edge 95 is placed on the rockable member 22 directly in the region of the axis of shaft 20, which is the rocking axis of member 22, the amplitude of the zig-zag stitches will be zero, in other words, no zig-zag motion will be performed. When the knife edge 95 is placed at the end of rockable member 22, a zig-zag stitch of maximum amplitude will be made.

The buttonhole stitching device

Figure 9:
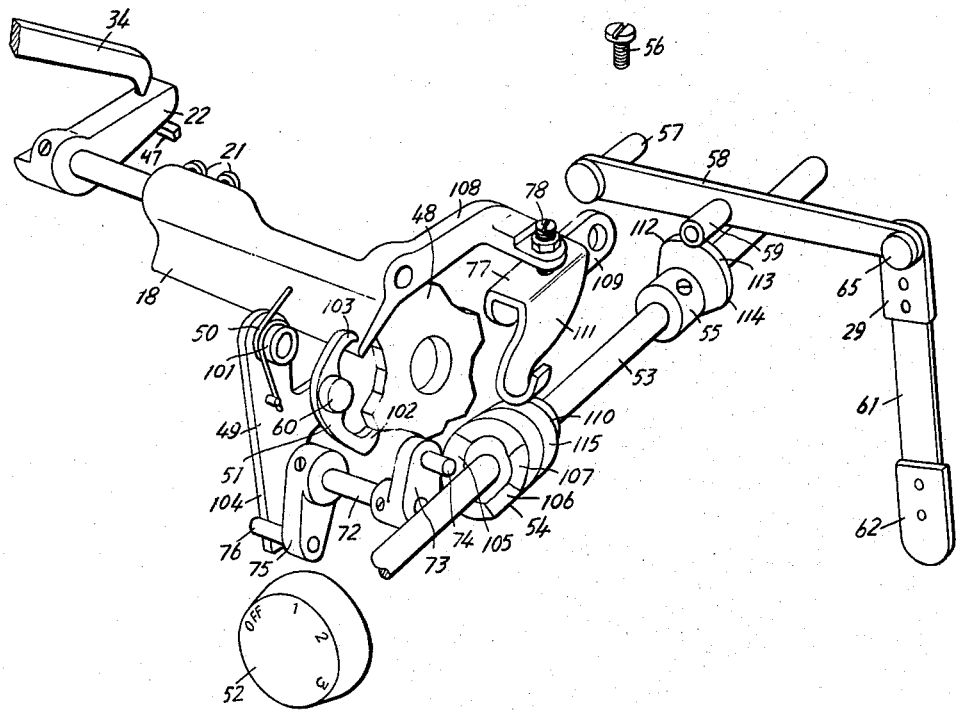
FIG. 9 is a fragmentary perspective view illustrating the buttonhole stitching control device according to the present invention, with parts of the sewing machine omitted for the sake of clarity.
Figure 10:
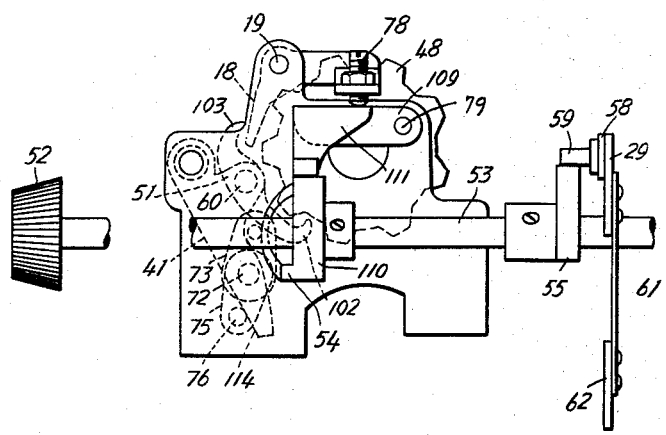
FIG. 10 is a side elevation of the buttonhole stitching control device taken on line X—X in FIG. 2.

The buttonhole stitching device of the present invention is best seen in FIGS. 2, 9, and 10. An operating cam 48 is mounted on shaft 2 at the end of cam unit 3 and is rotated by cam shaft 2. A movable support member 49 is turnably mounted on shaft 9 by means of a bearing part 101. A wire spring 50 is mounted on bushing 101 and has one arm abutting the fixed plate 16, see FIG. 2, and another end engaging a projection on the movable support 49 so that support 49 is biased to turn in clockwise direction as viewed in FIG. 9. A cam follower 51 is mounted on the movable support 49 for turning movement about a pivot pin 60, and has one arm 102 cooperating with the operating cam 48, and another arm 43 cooperating with the rockable member 18.

As explained above, rockable member 22 is urged to turn in clockwise direction by arm 34 under the action of spring 65 of the needle support 30, and consequently rockable member 18 will tend to turn cam follower 51 in counterclockwise direction and into engagement with operating cam 48. However, the lower stop 47 limits such turning movement of rockable members 22 and 18, so that cam follower 51 can be held by movable support 49 in a position in which arm 103 is slightly spaced from rockable member 18 whose turning movement is stopped by the lower stop 47. This position is obtained when the control knob 52 is in its "off" position, as will be explained hereinafter in greater detail. Consequently rockable member 18 is free to perform an oscillatory movement under the control of the cams of the cam unit 3 when the control knob 52 of the buttonhole stitching device is in its "off" position.

A control shaft 53 is operated by knob 52, and carries a first control cam 54 with cam portions 105, 106, 107, a second control cam 110, which is constructed integral with cam 54 and a third control cam 55. All three control cams are turned through the same angle.

Control cam 54 has an annular cam track including cam track portions 105, 106 and 107 which cooperate with a cam follower pin 74 secured to a lever arm 73 on a shaft 72 which is mounted in the frame of the machine for turning movement. The other end of shaft 72 has another arm 75 provided with a pin 76 abutting the edge 104 of the movable support 49. Since spring 50 urges support 49 to turn in clockwise direction as viewed in FIG. 9, edge 104 abuts pin 76 of the cam follower device 73 to 76 and urges the cam follower pin 74 against the cam track of cam 54.

The cam track 115 of control cam 110 cooperates with a cam follower part 111 of a stop means 77 which has an extension 109 with a bearing bore through which a pivot pin 79 passes so that stop means 77 is supported for movement under control of the cam track 115 of cam 110.

The rockable member 18 has an arm 108 on which an adjustable stop screw 78 is mounted. Cam track 115 has a cam lobe which raises cam follower part 111 of stop means 77 when knob 52 is in the position "3." In the other positions of knob 52, stop means 77 is free to move to a lower position in which the adjustable stop 78 does not engage the top face of stop means 77.

The third control cam 55 has a circular cam track portion 116, two cam portions 112 and 114, and an intermediate portion 113. Cam 55 cooperates with a cam follower roller 59 mounted on a lever 58 which is supported for turning movement on an eccentric portion of a shaft 57. The free end of the lever 58 is articulated to a link which includes two end portions 29 and 62, and an intermediate leaf spring 61. As shown in FIG. 6, the end portion 62 is articulated to a feed control element 63 which is biased by a spring 64, so that cam follower roller 59 is urged against control cam 55. Feed control element 63 controls the feeding means of the machine, and has a "forward" position in which the feeding means feed the material under the needle in forward direction, a "reverse" position in which the feeding means feed the material in the opposite direction, and an intermediate position in which the feeding means are not operative so that the material is not transported. The cam track of cam 55 is so arranged and constructed that the cam portion 112 effects through cam follower 59, and levers 58 and 61, movement of the feed control element 63 to the "forward" position, while the cam portion 14 effects movement of the feed control element 63 to the "reverse" position. When intermediate cam portion 113 engages cam follower roller 59, the feeding means does not operate, and the material is not transported. In the "off" position of knob 52, the low portion of cam 55 is located opposite cam follower 59, so that the feeding means are in no way influenced by cam 55. In this position, the feed control element 63 can be manually shifted by operation of the knob R, shown in FIGS. 1 and 6.

Figure 12:
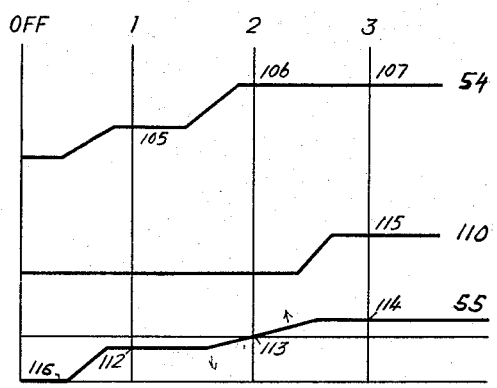
FIG. 12 is a diagram showing the developed cam profiles of the control cams by which the stitch amplitude, and the feeding direction are controlled.
Figure 11:
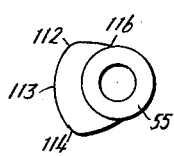
FIG. 11 is a side elevation of a control cam controlling the feed direction.

The relation between the cam portions of the three control cams 54, 110 and 55 will be best understood with reference to FIG. 12. When knob 52 is in the "off" position, the lowest portion of cam 54 is located opposite the pin 74 of the cam follower device 72 to 76, a low circular part of cam 110 is located opposite cam follower part 111, and the low part 116 of cam 55 is located opposite cam follower roller 59. Consequently all three cams are inoperative.

When knob 52 is turned to position "1" cam portion 105 is located opposite the cam follower device so that arms 73 and 75 turn in counterclockwise direction as viewed in FIG. 9, and pin 76 turns movable support 49 in counterclockwise direction so that cam follower 51 moves closer toward rockable member 18 and engages operating cam 48. The low portion of cam 110 is still located opposite cam follower part 111, so that stop means 77 and 78 is inoperative. The "forward" cam portion 112 of cam 55 is located opposite cam follower 59 so that the feed control element 63 is held in its "forward" position. However, the displacement of the feed control element is very small so that the material will be slowly transported under the needle.

Figure 13:
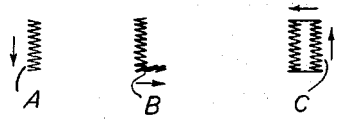
FIG. 13 illustrates three consecutive stages of the buttonhole stitching operation carried out by the device of the present invention.

In the above described position of the elements, the cam follower 51 will be oscillated about pivot 60 by operating cam 48, and will effect an oscillatory movement of rockable members 18 and 22. Projecting cam portions on operating cam 48 will turn cam follower 51 in clockwise direction, resulting in counterclockwise turning of the transmission means 18, 20, 22, away from the lower stop 47 so that arm 34 is raised, and the needle support 30 with needle holder 31 is oscillated to effect a zig-zag stitch while the material is simultaneously slowly fed in forward direction so that a row of closely spaced zig-zag stitches is made on one side of the buttonhole as shown in FIG. 13 at A.

The stitches of this row have a small amplitude since the left end of each stitch is limited by stop means 47, while the right end of each stitch is limited by the displacement of cam follower means 51 by operating cam 48.

When the end of the buttonhole is reached by the needle, the operator turns control knob 52 to position "2" so that the higher cam portion 106 of control cam 54 cooperates with the cam follower device 74 to 76. As best seen in FIG. 12, the low cam portion of cam 110 is still located opposite the stop means 77 so that the same is inoperative. The portion 113 of control cam 55 is located opposite cam follower 59 so that the feeding means are inoperative, and the material is not transported.

Since cam portion 106 of cam 54 is higher, the cam follower device 72 to 76 is further turned in counterclockwise direction, so that support 49 is turned in counterclockwise direction about pivot 9. Thereby, cam follower 51 is moved closer to the rockable member 18 and to operating cam 48 so that during rotation of operating cam 48, cam follower means 51 will turn rockable member 18 through a greater angle, resulting in a corresponding greater angular displacement of rockable member 22 away from the lower stop means 47, and in a greater angular displacement of arm 33, 34 and of needle support 30. Consequently the needle will be moved in a zig-zag stitch of greater amplitude. Since the material is not transported in position "2," the full width stitches will overlap at the lower end of the buttonhole, as shown in FIG. 13 at B.

The operator now turns knob 52 to position "3" so that cam portion 107 of cam 54 cooperates with the cam follower device 72 to 76. As clearly shown in FIG. 12, cam portions 106 and 107 are the same height, so that the cam follower device 72 to 76, support 49, and cam follower means 51 remain in the same position as when the knob 52 was in the position "2."

While knob 52 is in position "3," the high cam portion 115 of control cam 110 cooperates with the cam follower part 111 of stop means 77 and raises stop means 77 so that during rocking movement of rockable member 18, the adjustable stop 78 engages the top face of stop means 77.

As shown in FIG. 12, "reverse" cam portion 114 is now effective to shift the feed control element 73 in a position in which the material is transported in the opposite direction. Consequently, the stitches will now be formed on the right side of the buttonhole in the direction of the arrow as shown in FIG. 13 at C.

The stitches made in position "3" of knob 52 are small stitches due to the action of stop means 77. Since the cam follower device 72 to 76, and cam follower means 51 were not displaced relative to the position "2," cam follower 51 tends to move the rockable member 18 in a full amplitude stitch, as before, so that the right end of each stitch is aligned with the right end of the full amplitude stitches performed in position "2." However, since the adjustable stop 78 engages stop means 77 before rockable member 22 engages stop means 47, rockable members 18 and 22 cannot swing in clockwise direction as far as in position "2" so that the left end of each stitch is limited, and narrow stitches are produced. The spacing between the left end of the stitches A and the left end of the stitches C in FIG. 13 correspond to the angular spacing between the first stop means 47, and the second stop means 77 in its operative position. The right end of stitches A and the right end of stitches B and C are determined by the position of the cam follower 51 which is controlled by control cam 54.

By adjustment of the adjustable stop screw 78, the exact length of the stitches C can be determined. The exact length of the stitches A can be adjusted by turning arm 75 of the cam follower device relative to arm 73, or by adjustment of stop 47. The narrow stitches on the sides of the buttonhole will have approximately half the width of the stitches which secure the ends of the buttonhole.

It will be understood that after the row of stitches C has been completed, control knob 52 is again turned to position "2" to make full length stitches at the upper end of the buttonhole.

Since the control of the feeding means for the material must be exactly correlated with the control of the amplitude of the stitches, lever 58 is mounted on an eccentric part of pin 57. Pin 57 can be turned and secured by set screw 56 so that lever 58 can be slightly displaced in longitudinal direction to place cam follower roller in proper relationship to the cam portions 112, 113 and 114, and also to effect the desired slow feeding of the material by which a close spacing of the narrow stitches on the sides of the buttonhole is obtained.

From the above description of a preferred embodiment of the present invention it will become apparent that the buttonhole stitching control device of the present invention comprises an oscillatory needle support 30, 33, 34, 95, operating means including cam 48, cam follower means 51, and transmission means 18, 20, 22, first stop means 47 for limiting movement of the needle support in an end position; second stop means 77 for limiting movement of the needle support before it reaches the first stop means 47; and control means including manually operated member 52, and three control cams 54, 110, and 55 which respectively control the operating means 48, 51, 18, 22, the second stop means 77, and the feed control element 63.

It will be understood that each of the elements described above, or two or more together, may also find a useful application in other types of sewing machines differing from the types described above.

While the invention has been illustrated and described as embodied in a buttonhole stitching control device in which all operations are controlled by a single manually operated knob, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A buttonhole stitching control device comprising, in combination, an oscillatory needle support for effecting a zig-zag stitch of a needle supported thereon; operating means for oscillating said needle support and having a first position for effecting a small stitch on one side of a buttonhole and a second position for effecting a wide stitch across the ends of the buttonhole; stop means movable between an inoperative position, and an operative position for limiting movement of said needle support; and control means operatively connected to said operating means and to said stop means for holding the latter in said inoperative position while said operating means is in said first position, and for holding said stop means selectively in said inoperative and operative positions while said operating means is in said second position for respectively effecting said wide stitch, and a small stitch on the other side of the buttonhole displaced relative to said first-mentioned small stitch.

2. A buttonhole stitching control device comprising, in combination, an oscillatory needle support for effecting a zig-zag stitch of a needle supported thereon; operating means for oscillating said needle support including a rotary driven cam, a cam for oscillating said needle support and cooperating with said cam, and a carrier supporting said cam follower for movement toward and away from said cam and having a first position for effecting a small stitch on one side of a buttonhole and a second position for effecting a wide stitch across the ends of the buttonhole; first stop means for limiting movement of said needle support in one direction in an end position; second stop means movable between an inoperative position, and an operative position for limiting movement of said needle support in said one direction before said needle support reaches said end position; and control means operatively connected to said carrier and to said second stop means for holding the latter in said inoperative position while said carrier is in said first position, and for holding said second stop means selectively in said inoperative and operative positions while said carrier is in said second position for respectively effecting said wide stitch, and a small stitch on the other side of the buttonhole displaced relative to said first-mentioned small stitch.

3. A buttonhole stitching control device comprising, in combination, an oscillatory needle support for effecting a zig-zag stitch of a needle supported thereon; operating means for oscillating said needle support and having a first position for effecting a small stitch on one side of a buttonhole and a second position for effecting a wide stitch across the ends of the buttonhole; first stop means for limiting movement of said needle support in one direction in an end position; spring means connected to said needle support for urging the same in said one direction toward said end position; second stop means movable between an inoperative position, and an operative position for limiting movement of said needle support under the action of said spring means in said one direction before said needle support reaches said end position; and control means operatively connected to said operating means and to said second stop means for holding the latter in said inoperative position while said operating means is in said first position, and for holding said second stop means selectively in said inoperative and operative positions while said operating means is in said second position for respectively effecting said wide stitch, and a small stitch on the other side of the buttonhole displaced relative to said first-mentioned small stitch.

4. A buttonhole stitching control device comprising, in combination, an oscillatory needle support for effecting a zig-zag stitch of a needle supported thereon; operating means for oscillating said needle support and having a first position for effecting a small stitch on one side of a buttonhole and a second position for effecting a wide stitch across the ends of the buttonhole; stops means movable between an inoperative position, and an operative position for limiting movement of said needle support; and control means including a first control cam operatively connected to said operating means and a second control cam operatively connected to said stop means for holding the latter in said inoperative position while said operating means is in said first position, and for holding said stop means selectively in said inoperative and operative positions while said operating means is in said second position for respectively effecting said wide stitch, and a small stitch on the other side of the buttonhole displaced relative to said first-mentioned small stitch.

5. A buttonhole stitching control device comprising, in combination, an oscillatory needle support for effecting a zig-zag stitch of a needle supported thereon; operating means for oscillating said needle support and having a first position for effecting a small stitch on one side of a buttonhole and a second position for effecting a wide stitch across the ends of the buttonhole; first stop means for limiting movement of said needle support in one direction in an end position; spring means connected to said needle support for urging the same in said one direction toward said end position; second stop means movable between an inoperative position, and an operative position for limiting movement of said needle support under the action of said spring means in said one direction before said needle support reaches said end position; and control means including a first control cam operatively connected to said operating means and a second control cam operatively connected to said second stop means for holding the latter in said inoperative position while said operating means is in said first position, and for holding said second stop means selectively in said inoperative and operative positions while said operating means is in said second position for respectively effecting said wide stitch, and a small stitch on the other side of the buttonhole displaced relative to said first-mentioned small stitch, said control means including a manually operated member, and a shaft fixedly supporting said first and second control cams and being connected to and turned by said manually operated member.

6. A buttonhole stitching control device comprising, in combination, feeding means for a material to be provided with buttonhole stitching, and including a feed control element having a forward position for effecting feeding of the material in one direction, an intermediate position in which said feeding means is inoperative, and a reverse position for effecting feeding of the material in opposite direction; an oscillatory needle support for effecting a zig-zag stitch of a needle on the material; operating means for oscillating said needle support and having a first position for effecting a small stitch on one side of a buttonhole and a second position for effecting a wide stitch across the ends of the buttonhole; stop means movable between an inoperative position, and an operative position for limiting movement of said needle support; and control means operatively connected to said operating means and to said stop means for holding the latter in said inoperative position while said operating means is in said first position, and for holding said stop means selectively in said inoperative and operative positions while said operating means is in said second position for respectively effecting said wide stitch, and a small stitch on the other side of the buttonhole displaced relative to said first-mentioned small stitch, said control means being operatively connected to said feed control element for holding the same in said forward position while said operating means is in said first position, for holding the same in said intermediate position while said operating means is in said second position and said stop means is in said inoperative position, and for holding the same in said reverse position while said operating means is in said second position and said stop means is in said operative position.

7. A buttonhole stitching control device comprising, in combination, feeding means for a material to be provided with buttonhole stitching, and including a feed control element having a forward position for effecting feeding of the material in one direction, an intermediate position in which said feeding means is inoperative, and a reverse position for effecting feeding of the material in opposite direction; an oscillatory needle support for effecting a zig-zag stitch of a needle on the material; operating means for oscillating said needle support and having a first position for effecting a small stitch on one side of a buttonhole and a second position for effecting a wide stitch across the ends of the buttonhole; first stop means for limiting movement of said needle support in one direction in an end position; spring means connected to said needle support for urging the same in said one direction toward said end position; second stop means movable between an inoperative position, and an operative position for limiting movement of said needle support under the action of said spring means in said one direction before said needle support reaches said end position; and control means including a first control cam operatively connected to said operating means and a second control cam operatively connected to said second stop means for holding the latter in said inoperative position while said operating means is in said first position, and for holding said second stop means selectively in said inoperative and operative positions while said operating means is in said second position for respectively effecting said wide stitch, and a small stitch on on the other side of the buttonhole displaced relative to said first-mentioned small stitch, said control means including a manually operated member, and a shaft fixedly supporting said first and second control cam and being connected to and turned by said manually operated member, said control means including a third control cam secured to said shaft and operatively connected to said feed control element for holding the same in said forward position while said operating means is in said first position, for holding the same in said intermediate position while said operating means is in said second position and said second stop means is in said inoperative position, and for holding the same in said reverse position while said operating means is in said second position and said second stop means is in said operative position.

8. A device as set forth in claim 7 wherein said first control cam has a short cam portion for holding said operating means in said first position, and a longer cam portion for holding said operating means in said second position; and wherein said second control cam has an effective cam portion shorter than said longer cam portion of said first control cam.

9. A buttonhole stitching control device comprising, in combination, a driven rotary operating cam, having an axis of rotation; a cam follower means cooperating with said operating cam; an oscillatory needle support for effecting a zig-zag stitch of a needle supported thereon; transmission means for connecting said cam follower means with said needle support and being movable relative to the same; first stop means for limiting movement of said transmission means in one direction; spring means connected to said needle support for urging the same against said transmission means so that said transmission means moves to an end position engaging said first stop means; a second stop means movable between an inoperative position, and an operative position for limiting movement of said transmission means in said one direction before engagement with said first stop means; and control means operatively connected to said cam follower means for moving the same relative to said transmission means toward and away from said operating cam and transverse to the axis of rotation of the same for varying the amplitude of the oscillation of said cam follower means and transmission means away from said first stop means, said control means having a first position in which said operating cam causes movement of said cam follower means, said transmission means, and said needle support in an oscillatory movement limited by said first stop means for effecting a stitch of small amplitude on one side of a buttonhole, and having a second position and a third position in which said operating cam means causes movement of said cam follower means, said transmission means, and said needle support in an oscillatory movement for effecting a stitch of greater amplitude, said control means being operatively connected to said second stop means for holding the same in said inoperative position while said control means is in said first and second positions, and for holding the same in said operative position while said control means is in said third position whereby in said third position movement of said transmission means and needle support is limited by said second stop means for effecting a stitch of small amplitude on the other side of the buttonhole displaced in direction of the oscillatory movement relative to said first mentioned stitch of small amplitude.

10. A control device as set forth in claim 9 wherein said control means include a first control cam, a cam follower device cooperating with said first control cam, a movable support member supporting said cam follower means and being controlled by said cam follower device so that said cam follower means is moved relative to said transmission means in accordance with the shape of said first control cam means; and a second control cam connected to said first control cam for movement therewith, said second stop means having a cam follower part cooperating with said second control cam.

11. A control device as set forth in claim 10 and including a control shaft rigidly supporting said first and second control cams; and a manually operated member secured to said control shaft for simultaneously turning said first and second control cams.

12. A control device as set forth in claim 10 wherein said transmission means includes a rockable member cooperating with said cam follower means; and an adjustable stop screw mounted on said rockable member and cooperating with said cam follower part of said second stop means for limiting movement of said rockable member, of said transmission means, and of said needle support when said second control cam means shifts said cam follower part in said third position of said control means.

13. A control device as set forth in claim 12 wherein said cam follower part is supported for pivotal movement and is located between said second control cam and said adjustable stop screw, and is closer spaced from said adjustable stop screw in said third position of said control means than in said first and second position of said control means.

14. A control device as set forth in claim 9 wherein said transmission means includes a first rockable member cooperating with said needle support and a second rockable member cooperating with said cam follower means; wherein said first stop means cooperates with said first rockable member so that the same abuts said first means while said spring means urges said needle support against said first rockable member in said inoperative position of said second stop means; and wherein said second stop means cooperates with said second rockable member.

15. A control device as set forth in claim 14 wherein said second stop means includes a cam follower part; and wherein said control means include a control cam cooperating with said cam follower part for moving the same to an operative position cooperating with said second rockable member in said third position of said control means.

16. A buttonhole stitching control device comprising, in combination, feeding means for a material to be provided with buttonhole stitching, and including a feed control element having a forward position for effecting feeding of the material in one direction, a neutral intermediate position in which said feeding means is inoperative, and a reverse position for effecting feeding of the material in opposite direction; a driven rotary operating cam; a cam follower means cooperating with said operating cam; an oscillatory needle support for effecting a zig-zag stitch of a needle on the material; transmission means for connecting said cam follower means with said needle support and being movable relative to the same; first stop means for limiting movement of said transmission means in one direction; spring means connected to said needle support for urging the same against said transmission means so that said transmission means moves to an end position engaging said first stop means; a second stop means movable between an inoperative position, and an operative position for limiting movement of said transmission means in said one direction before engagement with said first stop means; and control means operatively connected to said cam follower means for moving the same relative to said transmission means toward and away from said operating cam and transverse to the axis of rotation of the same for varying the amplitude of the oscillation of said cam follower means and transmission means away from said first stop means, said control means having a first position in which said operating cam causes movement of said cam follower means, said transmission means, and said needle support in an oscillatory movement limited by said first stop means for effecting a stitch of small amplitude on one side of a buttonhole, and having a second position and a third position in which said operating cam means causes movement of said cam follower means, said transmission means, and said needle support in an oscillatory movement for effecting a stitch of greater amplitude, said control means being operatively connected to said second stop means for holding the same in said inoperative position while said control means is in said first and second positions, and for holding the same in said operative position while said control means is in said third position whereby in said third position movement of said transmission means and needle support is limited by said second stop means for effecting a stitch of small amplitude on the other side of the buttonhole displaced in direction of the oscillatory movement relative to said first mentioned stitch of small amplitude, said control means being operatively connected to said feed control element for holding the same in said forward position while said control means is in said first position, for holding the same in said intermediate position while said control is in said second position, and for holding the same in said reverse position while said control means is in said third position.

17. A control device as set forth in claim 16 wherein said control means includes a first control cam operatively connected to said cam follower means, a second control cam operatively connected to said second stop means for shifting the same between said operative and inoperative positions, and a third control cam operatively connected to said feed control element; and a manually operated means connecting said first, second and third control cams for simultaneous movement.

18. A control device as set forth in claim 16 wherein said feed control element is turnable and effects more rapid feed if it is turned a greater angle out of said neutral position; and wherein said feed control element is turned a small angle out of said neutral position in said forward and reverse positions so that said small zig-zag stitches are closely adjacent on the material.

19. A sewing machine comprising a frame, a drive shaft rotatably journaled in said frame, a needle bar guide mounted in said frame for lateral movement, a cam shaft on said frame rotatably driven in timed relationship with said drive shaft, a radial pattern cam on said cam shaft, said pattern cam having high and low portions on its periphery, a cam follower carrier shiftably mounted on said frame for movement to and from said pattern cam, a cam follower lever pivotally journaled intermediate its ends on said carrier, said cam follower having one end engageable with said pattern cam, linkage means engageable by the other end of said cam follower to laterally move said needle bar guide responsive to movement of said cam follower induced by said pattern cam, and manual control means operable to adjust the position of said cam follower carrier and thereby adjust the amount of lateral movement of said needle bar guide produced by said pattern cam.

20. A sewing machine comprising a frame, a drive shaft rotatably journaled in said frame, a needle bar guide pivotally mounted in said frame for lateral swinging movement, a cam shaft on said frame rotatably driven in timed relationship with said drive shaft, a radial pattern cam on said cam shaft, said pattern cam having high and low portions on its periphery, a rocker shaft journaled on said frame, linkage means operable by rotation of said rocker shaft to oscillate said needle bar guide, a cam follower carrier shiftably mounted for movement to and from said pattern cam, a cam follower pivotally mounted intermediate its ends on said carrier, one arm of said cam follower adapted to engage the periphery of said pattern cam, the other arm of said cam follower adaptable to rock said rocker shaft in one direction, a selector cam having first and second cam portions thereon, control means responsive to one of said selector cam portions to shift said carrier toward said pattern cam whereby the high portion on said pattern cam actuates said cam follower to rock said rocker shaft in said one direction, means biasing said rocker shaft in the other direction, and stop means operable by the other of said selector cam portions to limit rotation of said rocker shaft in said other direction.

References Cited by the Examiner
UNITED STATES PATENTS
| | | | |
|---|---|---|---|
| 2,854,935 | 10/1958 | Benink et al. | 112—158 |
| 2,966,869 | 1/1961 | Fischer | 112—158 |
| 3,126,849 | 3/1964 | Giesselamann et al. | 112—158 |

FOREIGN PATENTS
| | | |
|---|---|---|
| 558,656 | 7/1957 | Belgium. |
| 535,025 | 10/1955 | Italy. |
| 564,305 | 6/1957 | Italy. |

FRANK J. COHEN, *Primary Examiner.*

THOMAS J. HICKEY, H. D. COOPER, R. V. SLOAN, R. J. SCANLAN, *Assistant Examiners.*